US011799105B2

(12) United States Patent
Keehn et al.

(10) Patent No.: US 11,799,105 B2
(45) Date of Patent: Oct. 24, 2023

(54) FUEL CELL DEPLOYMENT SYSTEMS AND APPARATUS

(71) Applicant: Microsoft Technology Licensing, LLC, Redmond, WA (US)

(72) Inventors: Nicholas Keehn, Kirkland, WA (US); Eric Clarence Peterson, Woodinville, WA (US); Sean Michael James, Olympia, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/897,726

(22) Filed: Aug. 29, 2022

(65) Prior Publication Data

US 2022/0416274 A1 Dec. 29, 2022

Related U.S. Application Data

(63) Continuation of application No. 16/410,448, filed on May 13, 2019, now Pat. No. 11,431,008.

(51) Int. Cl.
*H01M 8/04302* (2016.01)
*H01M 8/04992* (2016.01)

(52) U.S. Cl.
CPC ... *H01M 8/04302* (2016.02); *H01M 8/04992* (2013.01); *H01M 2250/10* (2013.01)

(58) Field of Classification Search
CPC ............... H01M 8/04302; H01M 8/04992
See application file for complete search history.

(56) References Cited

U.S. PATENT DOCUMENTS

2014/0272671 A1\* 9/2014 Handa .................. B60L 3/12
429/515

OTHER PUBLICATIONS

"Notice of Allowance Issued in European Patent Application No. 20720232.6", dated Mar. 24, 2023, 8 Pages.

\* cited by examiner

*Primary Examiner* — Karie O'Neill Apicella
(74) *Attorney, Agent, or Firm* — RAY QUINNEY & NEBEKER P.C.; Paul N. Taylor

(57) ABSTRACT

Techniques of deploying fuel cells in a facility are described herein. In one embodiment, a method includes identifying a location of the receptacle at the facility that the fuel cell is connected upon detecting the fuel connector of the second side of the carrier being coupled to a fuel port at a receptacle at the facility. The method can then include generating and storing, in a database, a fuel cell record indicating that the fuel cell is physically connected to the receptacle at the identified location in the facility and instructing a control device in the facility corresponding to the identified location to provide fuel to the fuel cell via the fuel port, the fuel connector, the connection between the first side and the second side of the carrier, and the fuel inlet of the fuel cell.

20 Claims, 12 Drawing Sheets

FUEL CELL DEPLOYMENT SYSTEMS AND APPARATUS

CROSS REFERENCE TO RELATED APPLICATIONS

This application claims priority to and benefit of U.S. patent application Ser. No. 16/410,448, filed May 13, 2019, which is incorporated herein in its entirety.

BACKGROUND

A fuel cell is an electrochemical cell that converts chemical energy from a fuel into electricity through an electrochemical reaction between the fuel and an oxidizing agent such as oxygen. Example fuels can include hydrogen ($H_2$), carbon monoxide (CO), natural gas (e.g., methane, propane, and butane), or other suitable compounds. A fuel cell typically has an anode, a cathode, and an electrolyte between the anode and the cathode. The electrolyte can be a liquid or solid that allows charged particles, such as oxygen anions or protons, to travel between the cathode and the anode. The charged particles can then react with the fuel or oxygen to produce heat and byproducts such as carbon dioxide ($CO_2$) and water ($H_2O$).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Fuel cell deployment can involve installation, commissioning, modification, removal, and/or other operations in a facility, such as a datacenter. Example deployment techniques for fuel cells include field erection of a fuel cell installation or skid mounting of fuel cells as assemblies to accommodate various configuration, dimension, function, or other types of differences in fuel cells provided by different manufacturers. For example, multiple fuel cells can be skid mounted as an assembly with common manifolds to be field connected to fuel, power, exhaust, coolant, or other suitable types of connections. Such deployment techniques, however, can be labor intensive, error prone, and/or difficult to modify or remove because of the manual nature of such operations. For instance, to replace a fuel cell in a skid-mounted assembly, technicians may manually disconnect or isolate various connections of the fuel cell before physical removal and replacement.

Several embodiments of the disclosed technology are directed to an automated fuel cell deployment system that is configured to accommodate fuel cells from different manufacturers using an intelligent carrier. The fuel cell can be mounted on the carrier at a manufacturer, at an assembler, or on-site at the facility. In certain implementations, a carrier can be configured to have certain size, shape, connection ports, and/or other characteristics to accommodate a fuel cell on a first side. The carrier can also include a second side having a suitable size, shape, connection ports, alignment elements, and/or other suitable mechanical/electrical features that are configured to mate with a receiving slot or "receptacle" in a facility, such as a datacenter. The carrier can provide connections for fuel, power, exhaust, or other suitable connections between the first side and the second side of the carrier. In certain embodiments, the second side of the carrier can be generally uniform for the facility. In other embodiments, the second side can also be configured differently to accommodate different fuel cells, batteries, or other suitable energy sources carried thereon.

The carrier can also include a carrier controller in communication with the fuel cell. The carrier controller can be configured to interrogate, receive, or otherwise acquire data representing information of the fuel cell carried thereon (referred to herein as "fuel cell information"). Example fuel cell information can include a manufacturer, a serial number, a designed/operating capacity, input/output connections, current operating state, etc. In certain embodiments, the fuel cell may include a memory containing at least some of the foregoing information that can be retrieved by the carrier controller. In other embodiments, the fuel cell may include a memory containing an identification (e.g., a manufacture and serial number) of the fuel cell. The carrier controller can be configured to obtain additional information (e.g., design/operating capacity) from an external source (e.g., a website of the manufacturer) using the identification. In further embodiments, carrier controller can obtain some or all of the fuel cell information regarding the fuel cell via user input or other suitable techniques.

Upon connection with the facility, in certain embodiments, the various connection ports on the second side of the carrier can be securely connected to corresponding ports on the facility side via friction, compression, magnetic, or other suitable types of fittings. The carrier controller can provide the collected fuel cell information of the fuel cell carried thereon to a facility controller. In turn, the facility controller can identify the fuel cell carried on the carrier as connected to a location with a location identification at the facility and store such information as a database record in a network storage. The facility controller can also be configured receive the fuel cell information and in response, activate suitable valves, solenoids, circuit breakers, or other suitable mechanical/electrical devices to provide or receive fuel, power, exhaust, coolant, or other suitable types of resources to or from the fuel cell on the carrier to commission the fuel cell. The facility controller can also be configured to issue operating commands to the fuel cell carried on the carrier according to the fuel cell information received from the carrier controller.

In other implementations, the carrier controller can communicate with the facility controller prior to the carrier is connected to the facility with information of the fuel cell. For example, the carrier controller can communication with the facility controller via a wireless or other suitable network connection to provide the facility controller the fuel cell information. In response, the facility controller can analyze the received fuel cell information and a current configuration of the facility and determine a suitable location for receiving the carrier.

Subsequently, the facility controller can inform a robot, an installation crane, a forklift, or other suitable devices to install the carrier in the determined location. In certain implementations, a robot can be configured to move the carrier with the fuel cell to the determined location. The robot and/or the carrier controller can then perform a verification operation to determine whether the carrier is at the determined location. In response to determining that the carrier is not at the determined location, the robot can navigate to another location based on instructions received from the facility controller and perform the verification operation prior to installation. Upon installation of the carrier, the facility controller can commission the fuel cell as described above.

In certain embodiments, the facility and/or the carrier can include certain alignment elements for automatic installation of the carrier. For example, the facility and/or the carrier can include suitable corresponding channels, edges, apertures, wedges, markers, or other suitable elements configured to mate with one another to align the carrier with the facility. For instance, the facility may include one or more apertures configured to mate with one or more alignment pins from the facility. In certain implementations, the robot can be configured to include one or more of a laser, a radar, a lidar, or other suitable types of sensor configured to identify and/or measure the various alignment elements on the facility. Based on the identified and/or measured distance, the robot can automatically install the carrier using the alignment elements to align the various ports on the carrier to those corresponding ports on the facility.

In a further implementation, the robot can include a robot controller that is configured to receive the fuel cell information from the carrier. The robot controller can then communicate with the facility controller to determine a suitable location for the carrier with the fuel cell. The robot can then navigate to the determined location and perform verification, installation, and/or other suitable operations as described above. In yet further implementations, the robot controller can be configured to receive an instruction to remove a carrier from the facility. In response, the robot controller can cause the robot to navigate to the determined location, perform a verification operation, and upon successful verification, remove the carrier automatically without manual intervention.

Several embodiments of the disclosed technology can allow automated and efficient management of fuel cells in the facility. For example, the facility controller can facility the robot to automatically install a fuel cell on a carrier irrespective of a type or manufacturer of the fuel cell. The facility controller can also track which fuel cell is installed in what location, monitor a current operating condition of the fuel cell, and adjust operations of the fuel cell based on the current operation conditions of the fuel cell and/or the facility. As such, manual operations involved in installing and/or removing fuel cells from the facility can be avoided. Avoidance of such manual operations can increase operational efficiency, reduce risks of installation errors, and reduce capital investment when compared to other fuel cell systems.

DETAILED DESCRIPTION

Figure 1A:
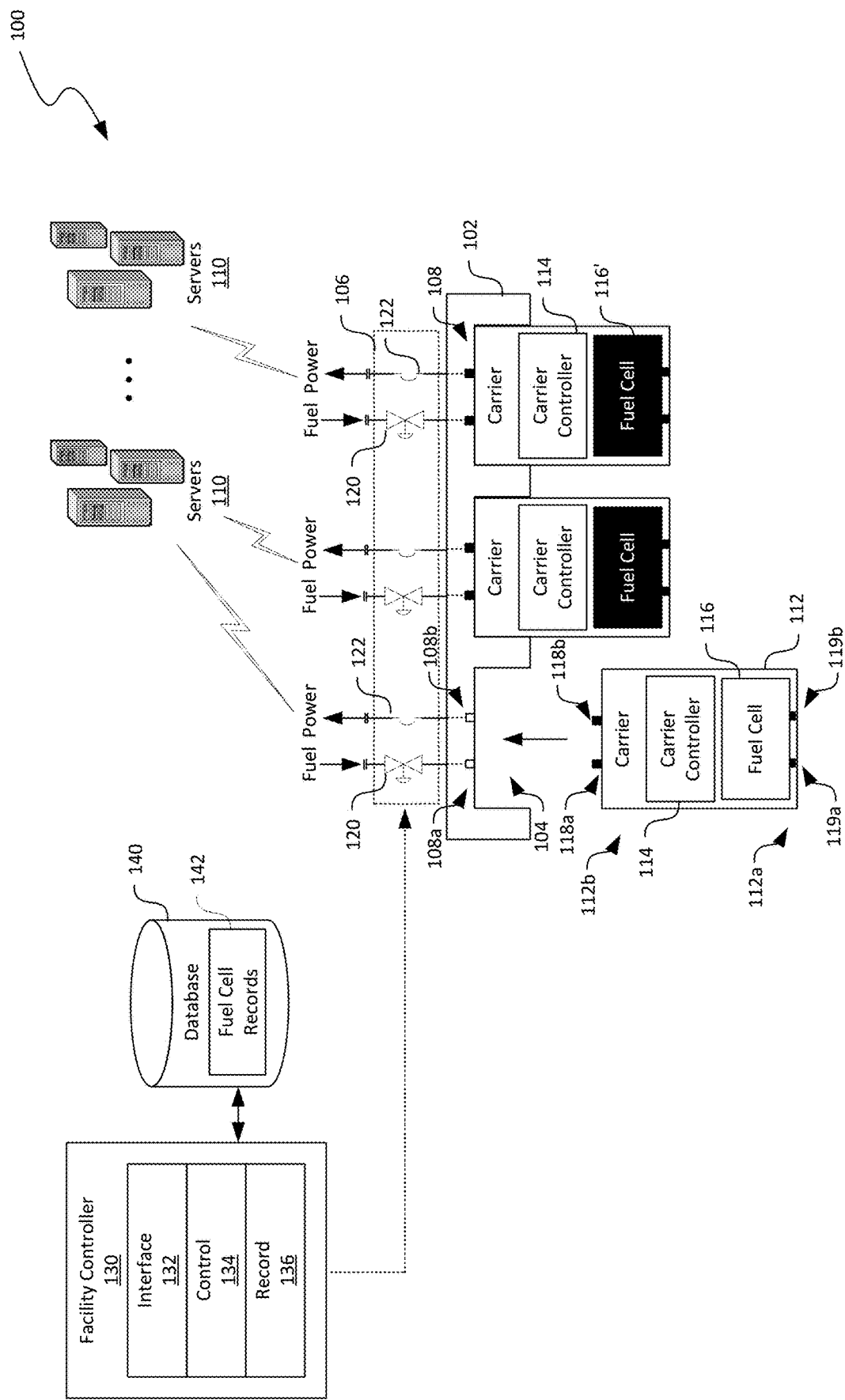
FIGS. 1A-1C are schematic diagrams illustrating operations of deploying fuel cells in a facility in accordance with embodiments of the disclosed technology.

Certain embodiments of systems, devices, components, modules, routines, data structures, and processes for automated fuel cell deployment systems in datacenters or other suitable facilities are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, a "fuel cell" generally refers to an electrochemical cell that converts chemical energy from a fuel into electricity through an electrochemical reaction between a fuel and an oxidizing agent such as air or oxygen. Example fuels can include hydrogen ($H_2$), carbon monoxide (CO), natural gas (e.g., methane, propane, and butane), or other suitable compounds. An example fuel cell typically has an anode, a cathode, and an electrolyte separating the anode from the cathode. The electrolyte can be a liquid or solid that allows charged particles, such as oxygen anions or protons, to travel from cathode to the anode or vice versa. The charged particles can then react with a fuel or oxygen to produce heat and byproducts such as carbon dioxide ($CO_2$) and water ($H_2O$). One example type of fuel cells is solid oxide fuel cells (SOFCs) that use a solid material, such as yttria-stabilized zirconia (YSZ) ceramic, as an electrolyte. SOFCs can thus be made entirely of solid materials.

Fuel cell deployment can involve installation, commissioning, modification, removal, and/or other operations in a facility, such as a datacenter. Example deployment techniques for fuel cells include field erection of a fuel cell installation or skid mounting of fuel cells as assemblies. Such techniques are typically used to accommodate various configuration, dimension, function, or other types of differences in fuel cells provided by different manufacturers. For example, multiple fuel cells can be skid mounted as an assembly with common manifolds to be field connected to fuel, power, exhaust, coolant, or other suitable types of connections. Thus, differences between fuel cells from different manufacturers may be accommodated in the skid. Such deployment techniques, however, can be labor intensive, error prone, and/or difficult to modify or remove because of the manual nature of such techniques. For instance, to replace a fuel cell in a skid-mounted assembly, technicians may manually disconnect or isolate various connections of the fuel cell before physical removal and replacement.

Several embodiments of the disclosed technology are directed to an automated fuel cell deployment system that is configured to accommodate fuel cells from different manufacturers using an intelligent carrier. A fuel cell can be mounted on the carrier at a manufacturer, at an assembler, or on-site at the facility. In certain implementations, a carrier can be configured to have certain size, shape, connection ports, and/or other characteristics to accommodate and receive a fuel cell on a first side. The carrier can also include a second side having a suitable size, shape, connection ports, alignment elements, and/or other suitable mechanical/electrical features that are configured to mate with or otherwise securely connect to corresponding connectors at a receiving slot or "receptacle" in a facility, such as a datacenter.

The carrier can also include a carrier controller in communication with the fuel cell and configured to interrogate, receive, or otherwise acquire data representing information of the fuel cell carried thereon (referred to herein as "fuel cell information"). The carrier controller can provide the collected fuel cell information of the fuel cell carried thereon to a facility controller. In turn, the facility controller can commission the fuel cell on the carrier by, for instance, the facility controller can activate suitable valves, solenoids, circuit breakers, or other suitable mechanical/electrical devices to provide or receive fuel, power, exhaust, coolant, or other suitable types of resources to or from the fuel cell. As such, several embodiments of the disclosed technology can allow automated and efficient management of fuel cells in the facility, as described in more detail below with reference to FIGS. 1-8.

Figure 1B:
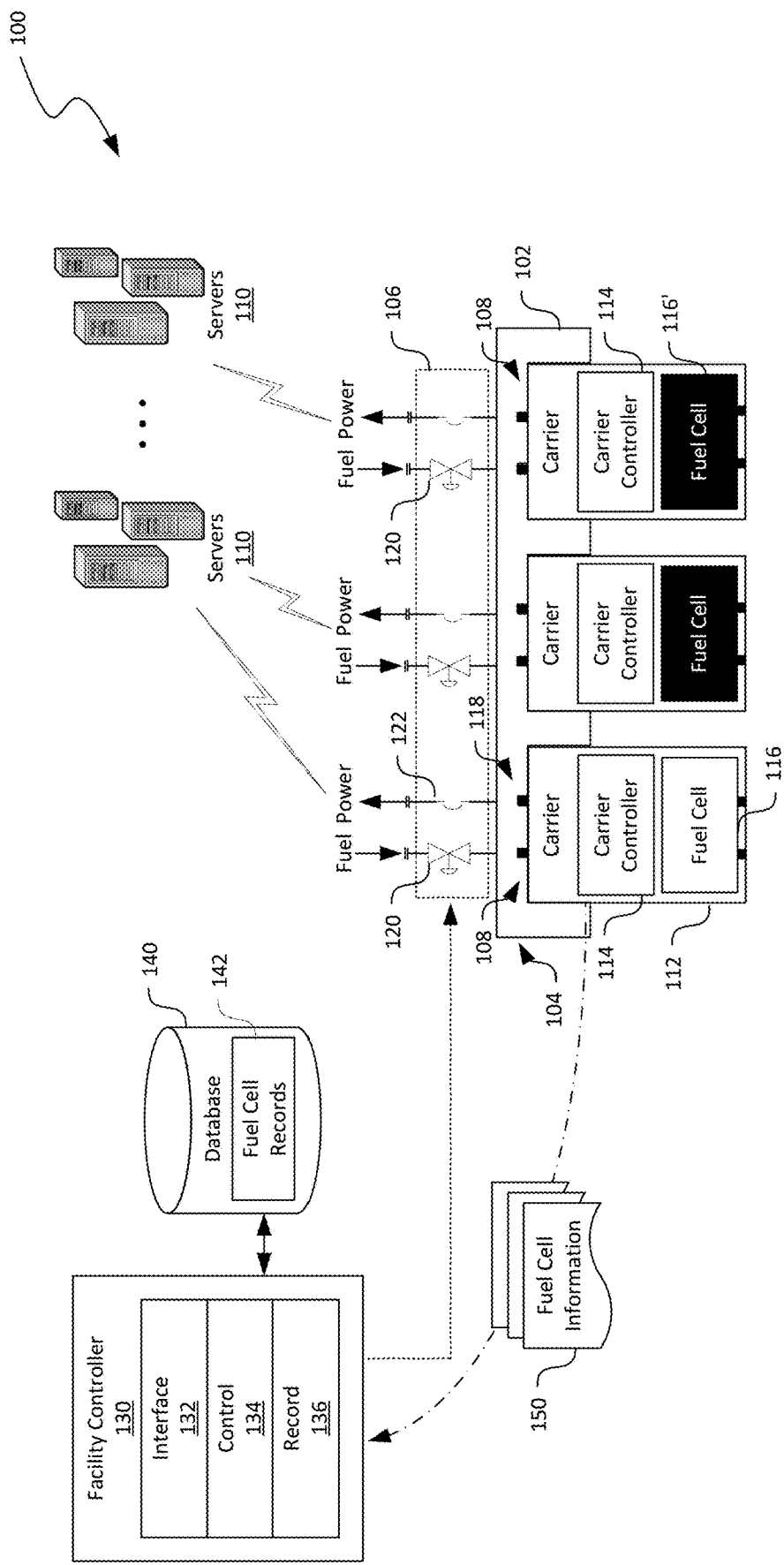
Figure 1C:
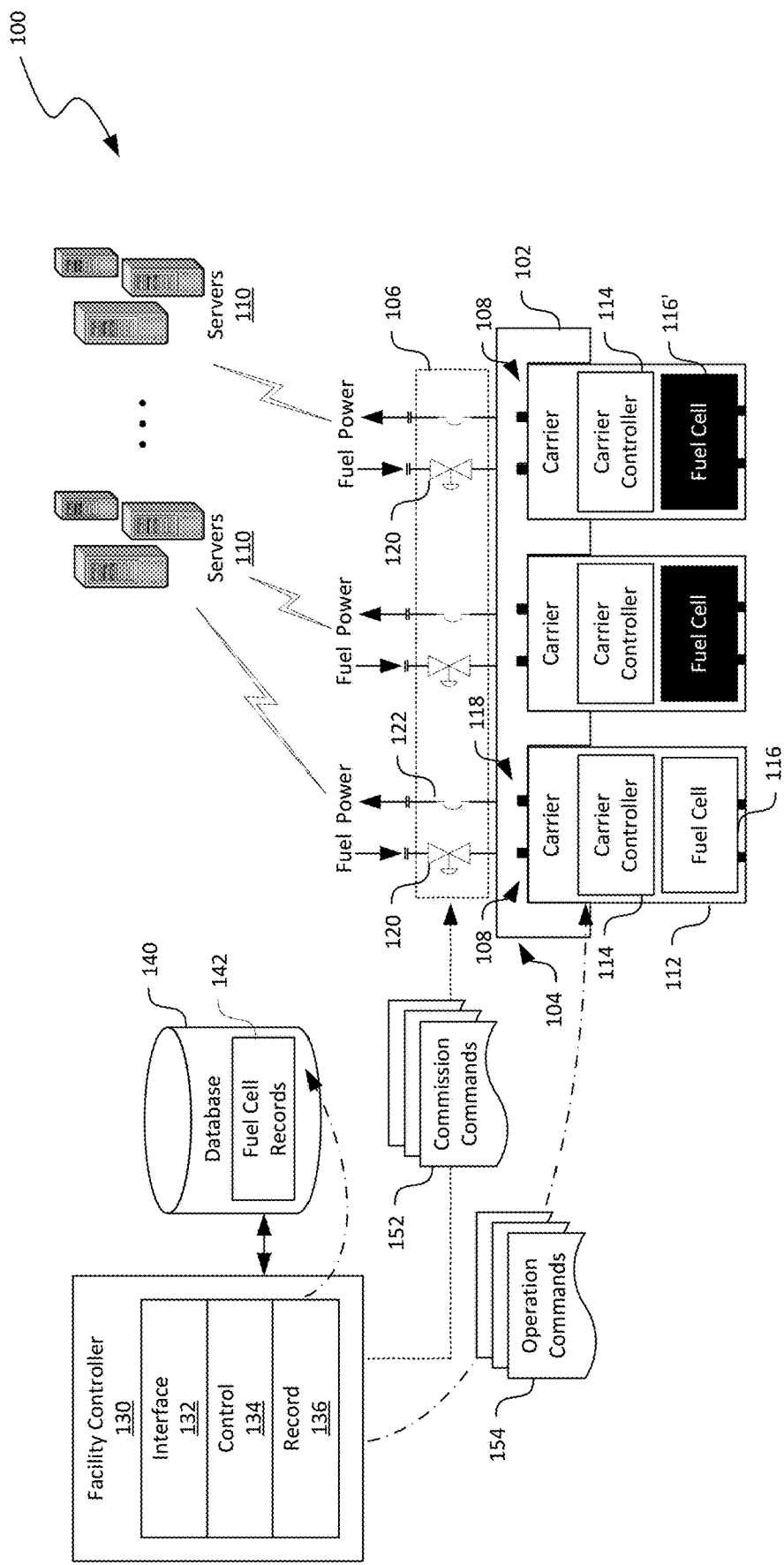

FIGS. 1A-1C are schematic diagrams illustrating operations of deploying fuel cells in a facility 100 in accordance with embodiments of the disclosed technology. In FIGS. 1A-1C and other figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the facility 100 can include a bay 102 of receptacles 104 individually configured to receive and connect to a fuel cell 116 on a carrier 112. The facility 100 can also include a facility controller 130 configured to interact with the fuel cells 116 on the corresponding carriers 112 for automatic commissioning, operation control, operation monitoring, and/or other suitable tasks. In the illustrated embodiment, the facility 100 is a datacenter that includes multiple servers 110 and/or other suitable computing devices (not shown) consuming power from the fuel cells 116 as a primary and/or backup power source. The bay 102 includes three receptacles 104. In other embodiments, the facility 100 can be a chemical processing plant, an office building, or other suitable types of facility with a bay 102 with any suitable numbers of receptacles 104. Even though the facility controller 130 is shown as a separate entity from the servers 110 of the facility 100, in further embodiments, the facility controller 130 can include one or more of the servers 110 in the facility 100 or a computing service hosted thereon.

The individual receptacles 104 of the bay 102 can include one or more ports 108 to controllably provide or receive a resource from the fuel cells 116 via the carrier 112. For instance, in the illustrated example, the receptacles 104 can include a fuel port 108a and a power port 108b (referred to herein as ports 108) interconnected to a control valve 120 and a circuit breaker 122, respectively. The control valve 120 can be configured to controllably introduce a fuel to the fuel cell 116 via the fuel port 108a while the power port 108b can be configured to receive power from the fuel cell 116. The received power from the fuel cell 116 can then be provided to the servers 110 as primary or backup power. In other examples, the receptacles 104 can also include an exhaust port (e.g., an exhaust hood), a coolant port (e.g., a cooling water port), or other suitable types of port controlled by other suitable types of control devices 106.

Though one control valve 120 and one circuit breaker 122 are shown in FIG. 1A as corresponding to a single receptacle 104 for illustration purposes, in certain implementation, the control devices 106 can include multiple control valves 120 and/or circuit breakers 122 (not shown) corresponding to a single receptacle 104. Each of the control valves 120 and/or circuit breakers 122 can correspond to a different fuel or power line in the facility 100. As discussed in more detail below with reference to FIG. 1B, the facility controller 130 can be configured to select one of the control valves 120 and/or circuit breakers 122 based on information from the fuel cell 116.

As shown in FIG. 1A, the carrier 112 can be configured to carry the fuel cell 116. In the illustrated example, the carrier 112 can include a first side 112a, a second side 112b, and one or more connections (not shown) between the first side 112a and the second side 112b. The first side 112a can have certain size, shape, connection ports, and/or other characteristics to accommodate the fuel cell 116. For instance, the first side 112a can include various connectors (not shown) connected to a fuel inlet 119a, a power outlet 119b, or other suitable types of inlet or outlet of the fuel cell 116. As such, the carrier 112 can be configured to accommodate fuel cells 116 from various manufacturers with different sizes, connection configurations, and/or other suitable features. For instance, the carriers 112 can accommodate fuel cells 116 and 116' (shown in reverse contrast) of different type, make, model, or other suitable characteristics.

The second side 112b can have a suitable size, shape, connection ports, alignment elements, and/or other suitable mechanical/electrical features that are configured to mate with a corresponding receptacle 104. In certain implementations, the second side 112b of the carriers 112 can be generally uniform. As such, the receptacles 104 on the bay 102 at the facility 100 can have a single size, shape, and/or connection configuration. In other implementations, the receptacles 104 at the bay 102 can have one or more different sizes, shapes, or connection configurations for different types of fuel cells 116, different types of power sources (e.g., battery) on the carrier 112, or based on other suitable criteria.

In the illustrated example in FIG. 1A, the second side 112b of the carrier 112 includes a fuel connector 118a and a power connector 118b (referred to herein as connectors 118). In other examples, the second side 112b of the carrier 112 can also include an exhaust connector, a coolant connector, or other suitable types of connector (not shown). The various individual connectors 118 on the second side 112b of the carrier 112 can be compression fitting, friction fitting, or other suitable types of quick disconnect style of connectors to efficiently mate with or coupled to corresponding ports 108 at the receptacle 104 at the bay 102.

Though not shown in FIG. 1A, the second side 112b of the carrier 112 can also include various suitable alignment features. For example, the second side 112b can include a protrusion (e.g., a wedge) that is configured to fit a corresponding recess (e.g., a hole configured to receive the wedge) on the receptacle 104 for coarse alignment. The second side 112b can also include alignment pins or other suitable alignment features configured to align the connectors 118 to the ports 108 at the receptacle 104. The second side 112b can also include sensors (e.g., electrical current detectors, position switches, etc.) can be used at the second side 112b and/or the receptacle 104 to ensure complete connections. In further examples, the carrier 112 can include a locking mechanism (e.g., a latch), a manual release, or other suitable mechanical/electrical components to ensure secure coupling of the carrier 112 to the receptacle 104.

The carrier 112 can also include a carrier controller 114 in communication with the fuel cell 116 and configured to interact with the facility controller 130 during commissioning and operation of the fuel cell 116. The carrier controller 114 can be configured to interrogate, receive, or otherwise acquire data representing information of the fuel cell 116 carried thereon (referred to herein as "fuel cell information" 150 shown in FIG. 1B). Example fuel cell information 150 can include a manufacturer (e.g., make, model, etc.), a serial number, a designed/operating capacity, input/output connections, current operating state, etc. In certain embodiments, the fuel cell 116 may include a memory (e.g., read-only memory, not shown) containing at least some of the foregoing information that can be retrieved by the carrier controller 114. In other embodiments, the fuel cell 116 may include a memory containing an identification (e.g., a manufacture and serial number) of the fuel cell 116. The carrier controller 114 can be configured to obtain additional information (e.g., design/operating capacity, etc.) from an external source (e.g., a website of the manufacturer) using the identification. In further embodiments, carrier controller 114 can obtain some or all of the fuel cell information 150 regarding the fuel cell 116 via user input or other suitable techniques.

The facility controller 130 can be configured to facilitate automatic commissioning and/or operation of the fuel cells 116 carried on the carriers 112 and received at corresponding receptacles 104. As shown in FIG. 1A, the facility controller 130 can include an interface component 132, a control component 1345, and a record component 136 operatively coupled to one another. The facility controller 130 can also be communicatively coupled to a storage 140 (e.g., a network storage) containing fuel cell records 142. In certain implementations, the fuel cell records 142 can individually contain data representing received fuel cell information 150 and location data of the corresponding fuel cell 116. Example location data can include a physical location of the receptacle 104 to which the fuel cell 116 is connected to via the carrier 112, a longitude/latitude of the receptacle 104, a global positioning system coordinate of the receptacle 104, a grid identifier in the facility 100, and/or other suitable types of location identifiers. FIG. 1A illustrates an operation stage before the carrier 112 carrying the fuel cell 116 is coupled to the receptacle 104 of the bay 102. Functions and/or operations of the various components of the facility controller 130 are described in more detail below with reference to FIG. 1B.

FIG. 1B illustrates an operational stage during which the carrier 112 with the fuel cell 116 is coupled to the receptacle 104 at the bay 102. Various techniques can be suitable for coupling the carrier 112 to the receptacle 104. For instance, the carrier 112 can be coupled manually to the receptacle 104. The carrier 112 can also be coupled automatically to the receptacle 104 using an automated mover 160 (shown in FIG. 3, e.g., a robot, an automated forklift, etc.), as described in more detail below with reference to FIGS. 3-4B. During coupling, various connectors 118 at the carrier 112 can be coupled to corresponding ports 108 at the receptacle 104. Complete connection can be monitored and detected using various sensors (not shown).

As shown in FIG. 1B, upon detecting that the carrier 112 with the fuel cell 116 is coupled to the receptacle 104 at the bay 102, the facility controller 130 can obtain fuel cell information 150 of the fuel cell 116 from the carrier controller 114. In one embodiment, the interface component 132 can be configured to detect that the carrier 112 is coupled to the receptacle 104 via one or more of a contact switch, a position switch, or other suitable types of connection sensors (not shown) and identify a location of the receptacle 104 at the facility 100 that the fuel cell 116 is connected to. In response to detecting that the carrier 112 is coupled to the receptacle 104, the interface component 132 can be configured to query the carrier controller 114 for the fuel cell information 150 via a wired (e.g., via the bay 102) or wireless link (e.g., a WIFI network link, not shown) in the facility 100. In response, the carrier controller 114 can transmit the fuel cell information 150 to the facility controller 130. In other embodiments, the carrier controller 114 can be configured to transmit the fuel cell information 150 in a push fashion, i.e., without being queried by the interface component 132, or in other suitable manners.

Upon receiving the fuel cell information 150, the interface component 132 can verify that the fuel cell information 150 is valid, e.g., by examining format, style, content, or other aspects of the received fuel cell information 150. Upon determining that the fuel cell information 150 is valid, the interface component 134 can be configured to forward the fuel cell information 150, the identified location of the receptacle 104 in the facility, and optionally other suitable information (e.g., date/time the carrier 112 is detected at the receptacle 104) to the control component 134 and the record component 106 for further processing.

The control component 134 can be configured to at least partially commission the fuel cell 116 on the detected carrier 112 automatically. As shown in FIG. 1C, in certain embodiments, the control component 134 can be configured to determine whether a fuel corresponding to a control valve 120 at the receptacle 104 is suitable for the fuel cell 116 on the carrier 112. For instance, the control component 134 can determine that the fuel cell 116 can be a SOFC, and the fuel is methane. In response, the control component 134 can be configured to issue commission commands 152 to the control valve 120 and/or the circuit breaker 122 at the receptacle 104 to activate these control devices 106. If the control component 134 determines that the fuel is not suitable for the fuel cell 116, the control component 134 can be configured to prevent the control valve 120 and/or the circuit breaker 122 being activated and issue an error message to an operator.

In other embodiments, the receptacle 104 can include multiple control valves 120 and/or circuit breakers 122 each corresponding to a different fuel or power line, respectively. The control component 134 can be configured to select one of the control valves 120 and/or circuit breakers 122 based on the received fuel cell information. For instance, the fuel cell information 150 can include data indicating that the fuel cell 116 is a SOFC. In response, the control component 134 can be configured to select a control valve 120 that is configured to introduce a mixture of methane, hydrogen, and carbon monoxide to the fuel cell 116. In another example, the fuel cell information 150 can include data indicating that the fuel cell 116 outputs a direct current (DC) at 48 volts. In response, the control component 134 can be configured to select and activate a circuit breaker 122 that is configured to connect the power output of the fuel cell 116 to a 48-volt DC bus. Upon confirming that commissioning of the fuel cell 116 is successfully completed, the control component 134 can be configured to issue operation commands to the fuel cell 116 directly or via the carrier controller 114 to commence start-up, normal operation, or other suitable operations of the fuel cell 116.

The record component 136 can be configured to generate and store, in the database 140, a fuel cell record 142 indicating that the fuel cell 116 carried on the carrier 112 is physically connected to the receptacle 104 at the identified location in the facility 100. The fuel cell record 142 can also include at least some of the received data representing the fuel cell information 150 from the fuel cell 116 via the carrier controller 114. Based on the fuel cell records 142, the control component 134 can also be configured to determine a suitable location for receiving, replacing, or otherwise managing fuel cells 116 in the facility 100, as described in more detail below with reference to FIGS. 2A-2C.

Figure 2A:
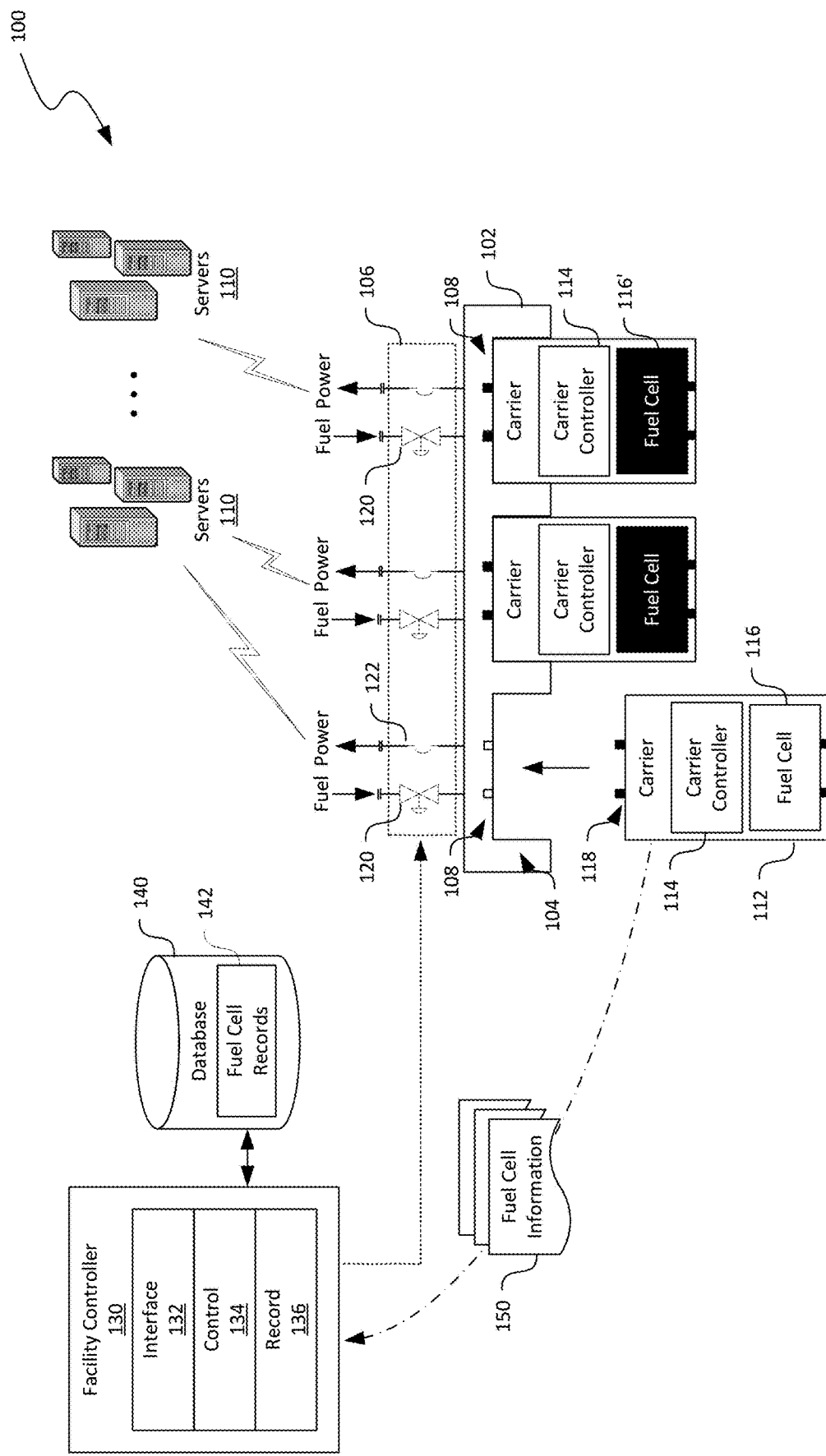
FIGS. 2A-2C are schematic diagrams illustrating operations of deploying fuel cells in a facility in accordance with additional embodiments of the disclosed technology.

As shown in FIG. 2A, unlike the embodiment shown in FIG. 1B, the carrier controller 114 of the carrier 112 can be configured to transmit the fuel cell information 150 to the facility controller 130 via a wireless or other suitable type of network. In response, the control component 134 can be configured to analyze the received fuel cell information 150 and select a receptacle 104 that is suitable for the fuel cell 116. For example, the control component 134 can be configured to identify a type of the fuel cell 116 (e.g., SOFC) based on the fuel cell information 150. Based on the identified type, the control component 134 can select a receptacle 104 suitable for receiving a SOFC by having suitable fuel supply, exhaust outlet, power output, etc. In another example, the control component 134 can also be configured to identify a make, model, or other suitable characteristics of the fuel cell 116 and select a receptacle 104 to receive the fuel cell 116 accordingly.

Figure 2B:
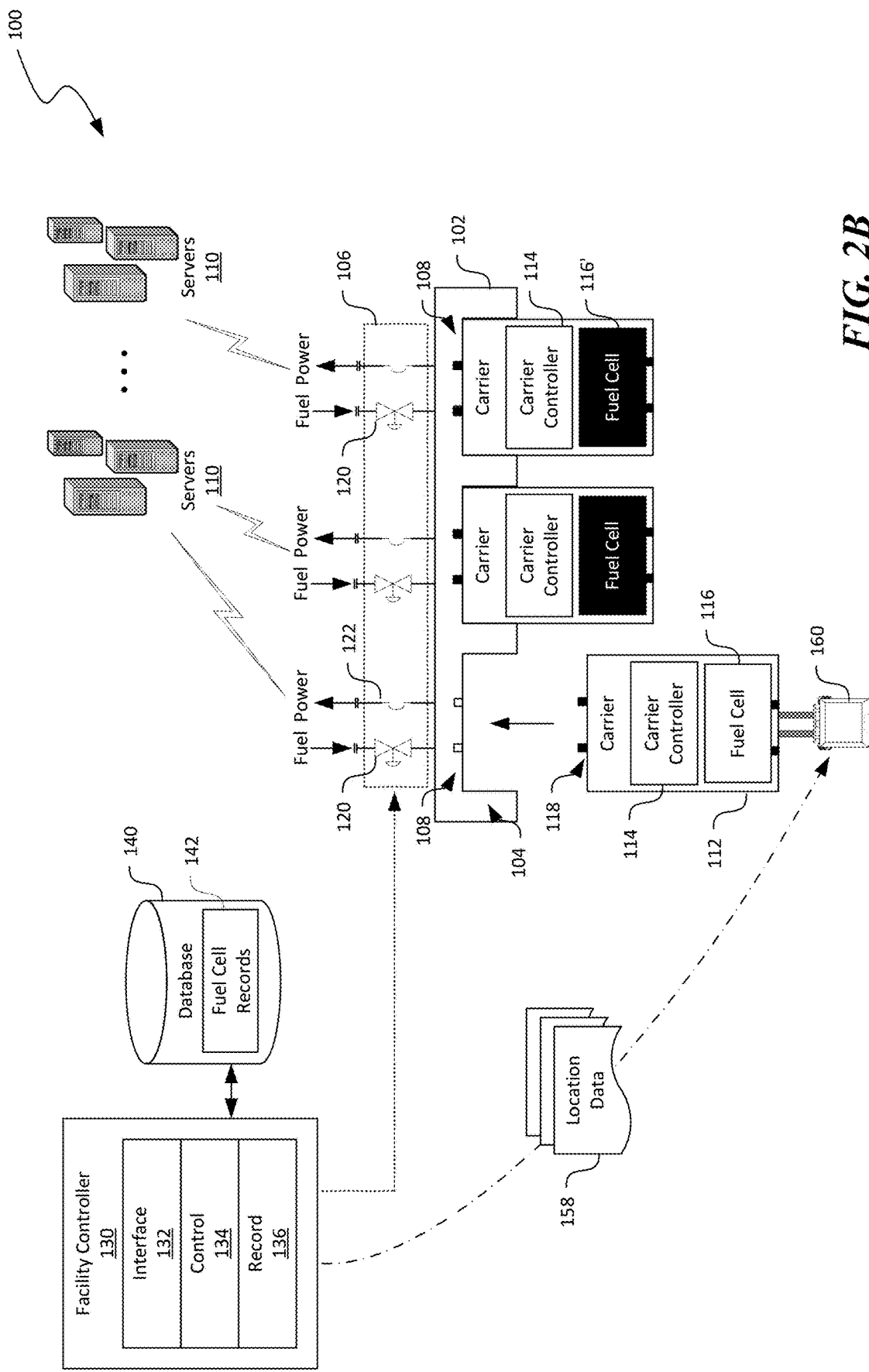
Figure 2C:
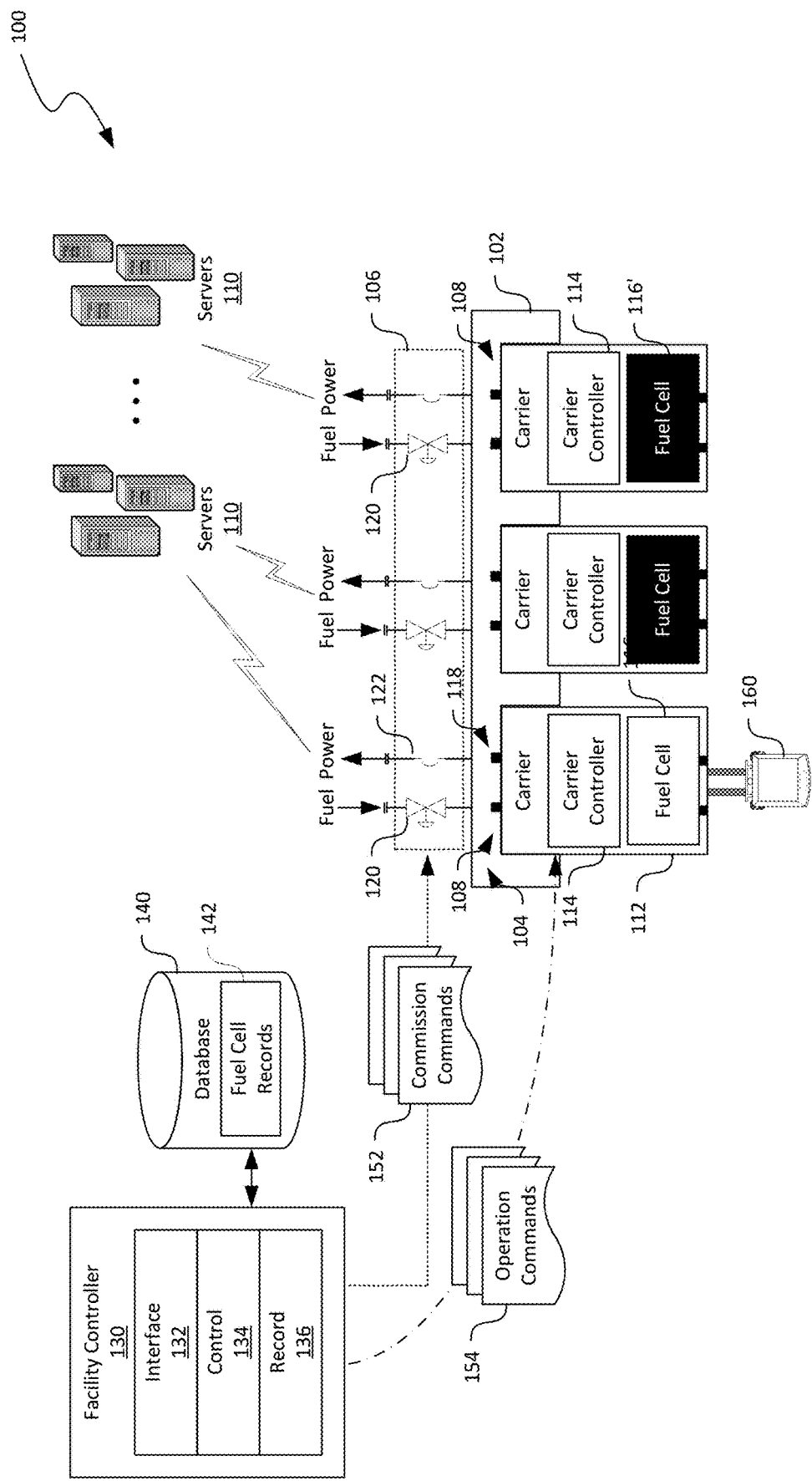

As shown in FIG. 2B, the control component 134 can then transmit location data 158 of the selected receptacle 104 to an automated mover 160. The automated mover 160 can include a robot, a robot arm, an automated forklift, or other suitable types of automated guided device configured to carry the carrier 112 with the fuel cell 116 and navigate through the facility 100 according to the location data 158. One suitable automated mover is provided by Raymond Corporation (Model No. 3030) of Greene, N.Y. In response, the automated mover 160 can carry the carrier 112 with the fuel cell 116 to the receptacle 104 according to the received location data 158 and coupled the carrier 112 to the receptacle 104 using various alignment features described above with reference to FIG. 1A. Upon detecting that the fuel cell 116 is coupled to the receptacle 104 by the automated mover 160, the facility controller 130 can be configured to automatically commission and operate the fuel cell 116 by issuing the commission commands 152 and the operation commands 154, as described above with reference to FIGS. 1B and 1C.

Figure 3:
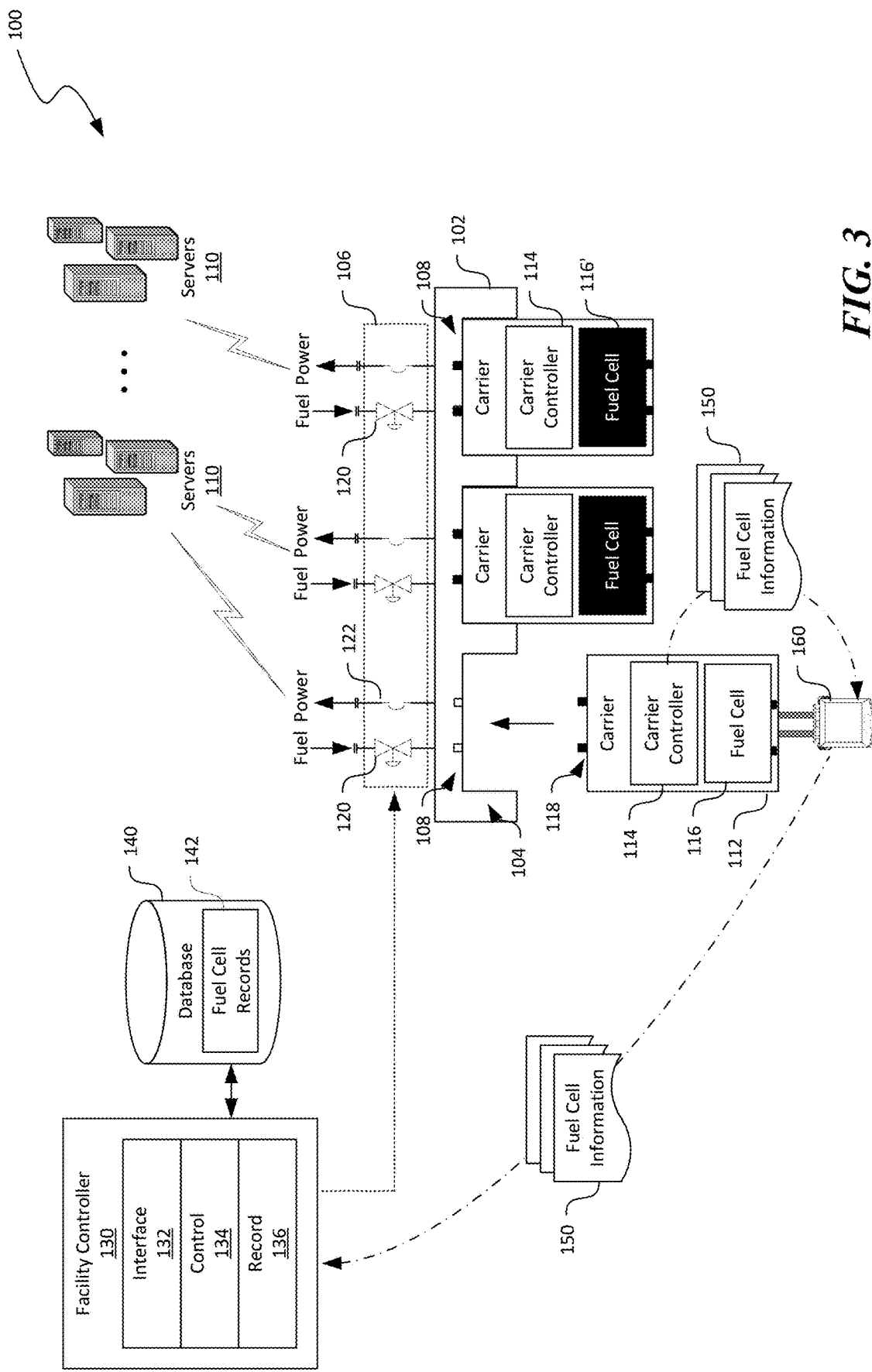
FIG. 3 is a schematic diagram illustrating another operation of deploying fuel cells in a facility in accordance with embodiments of the disclosed technology.

FIG. 3 is a schematic diagram illustrating another embodiment of deploying fuel cells 116 in the facility 100 in accordance with embodiments of the disclosed technology. As shown in FIG. 3, the automated mover 160 can be configured to interrogate or otherwise receive the fuel cell information 150 from the carrier controller 114. The automated mover 160 can then be configured to provide the fuel cell information 150 to the facility controller 130 and request for a location to install the fuel cell 116. In response, the facility controller 130 can be configured to identify a suitable receptacle 104 for the fuel cell 116 based on the fuel cell information 150, determine a location of the identified receptacle 104, and transmit the location data 158 to the automated mover 160, as described above with reference to FIG. 2B. The automated mover 160 can then be configured to carry the fuel cell 116 on the carrier 112 and install the fuel cell 116 to the receptacle 104 according to the location data 158, as described above with reference to FIG. 2C.

Figure 4A:
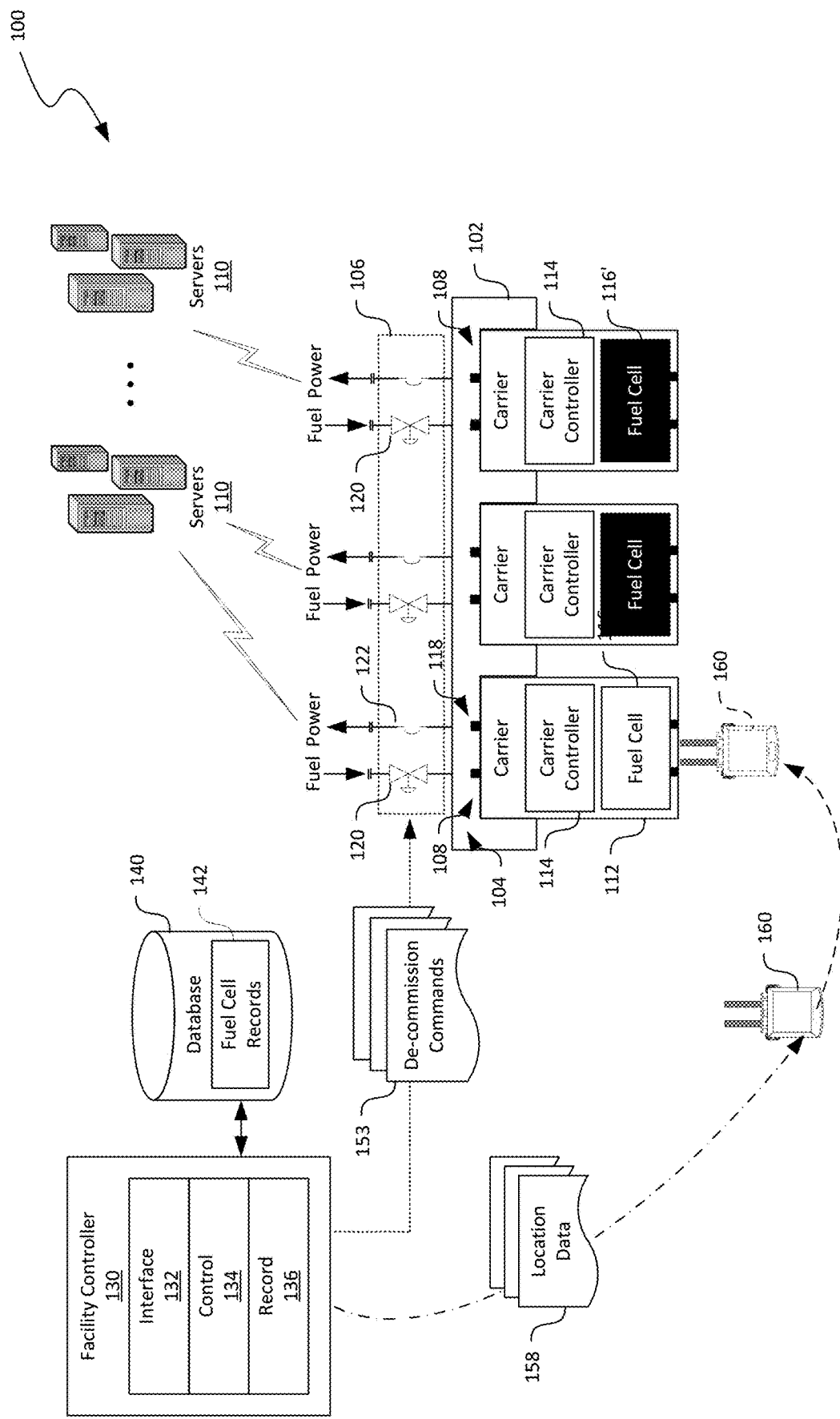
FIGS. 4A and 4B are schematic diagrams illustrating operations of removing a fuel cell in a facility in accordance with additional embodiments of the disclosed technology.
Figure 4B:
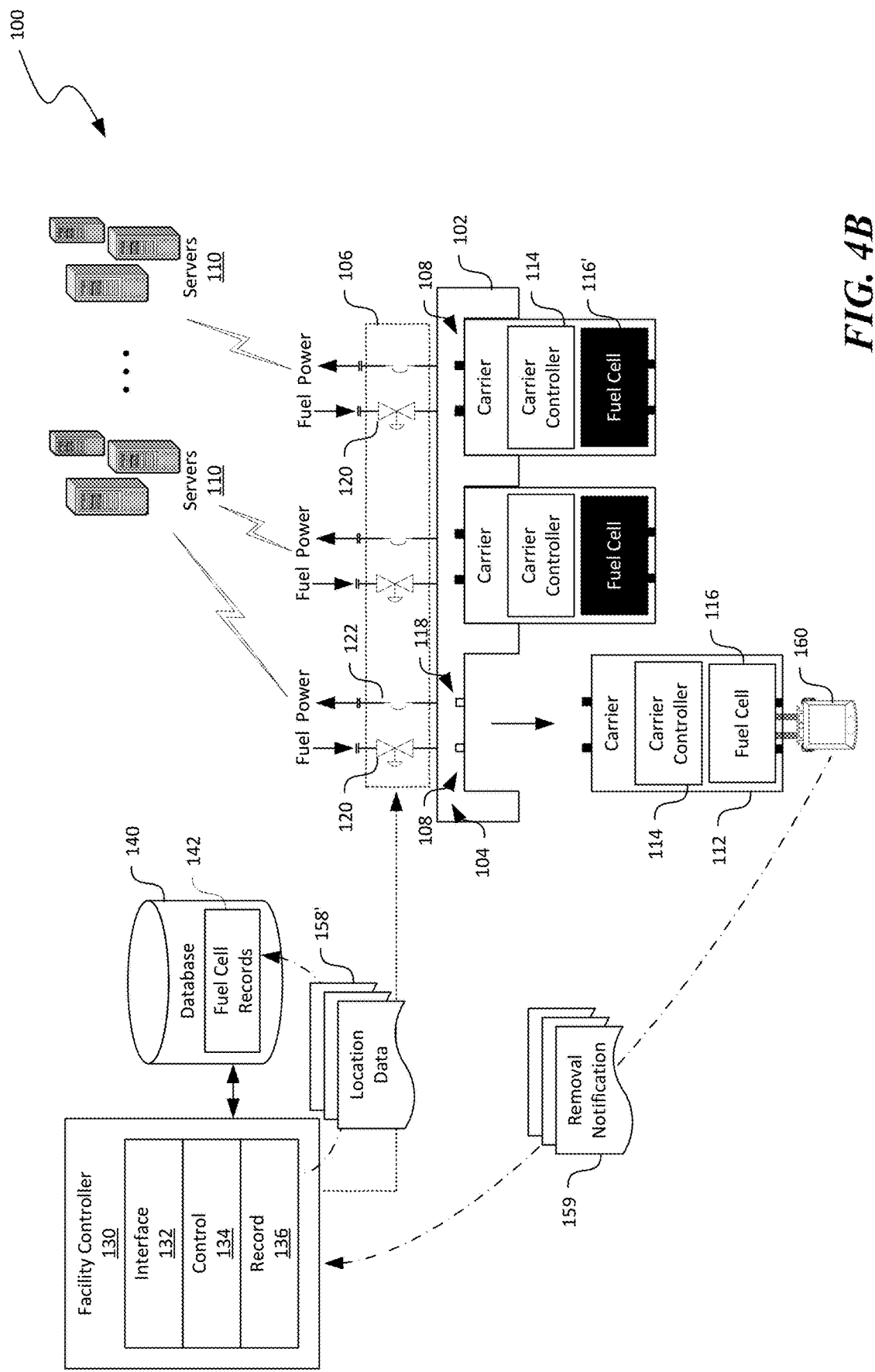

FIGS. 4A and 4B are schematic diagrams illustrating operations of automatically removing a fuel cell in a facility in accordance with additional embodiments of the disclosed technology. As shown in FIG. 4A, the control component 134 can be configured to determine that a fuel cell 116 at a receptacle 104 is to be removed based on user input, operating status, or other suitable criteria. The control component 134 can then be configured to determine location data 158 of the receptacle 104 and transmit the location data 158 to the automated mover 160. In response, the automated mover 160 can navigate through the facility 100 to the receptacle 104 according to the location data 158 and remove the carrier 112 carrying the fuel cell 116 from the receptacle 104.

The automated mover 160 can be configured to verify one or more of an identity of the carrier 112 and/or the fuel cell 116 thereon, a current status of the control devices 106 for the receptacle 104, a current condition of the fuel cell 116, and/or other suitable conditions before removing the carrier 112 from the receptacle 104. For example, the automated mover 160 can determine whether an identity of the carrier 112 and/or the fuel cell 116 is the same as that in the location data 158. The automated mover 160 can also determine whether all control devices 106 to the receptacle 104 are turned off. The automated mover 160 can further determine whether the fuel cell 116 is currently in an off state. Based on one or more of the foregoing determinations, the automated mover 160 can be configured to remove the carrier 112 from the receptacle 104 as shown in FIG. 4B, or not to remove the carrier 112 and issue an error message (not shown) to the facility controller 130. As shown in FIG. 4B, upon detecting that the fuel cell 116 on the carrier 112 is removed from the receptacle 104, the record component 136 can be configured to update the corresponding fuel cell record 142 in the database 140 indicating that the fuel cell 116 is no longer coupled to the receptacle 104.

Figure 5:
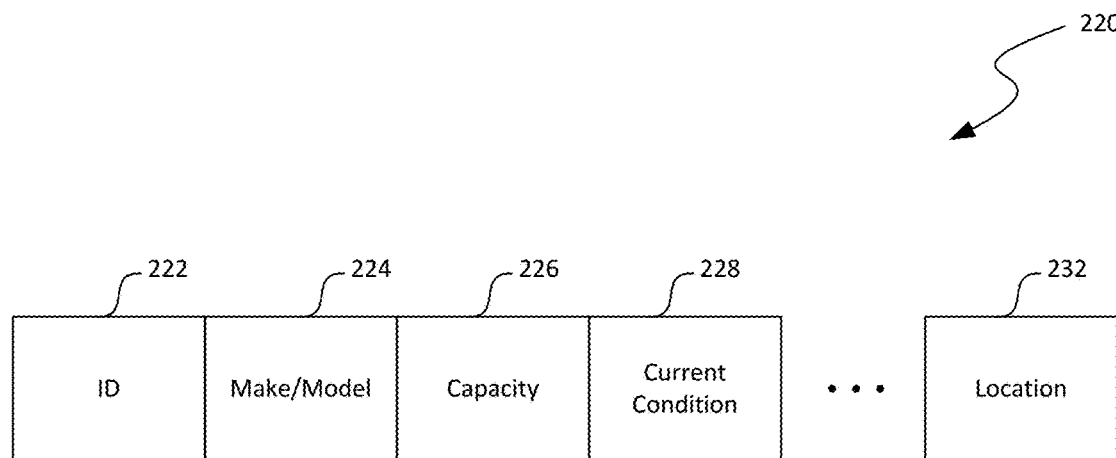
FIG. 5 is a schematic diagram illustrating an example data schema for a fuel cell record in accordance with embodiments of the disclosed technology.

FIG. 5 is a schematic diagram illustrating an example data schema 220 for a fuel cell record in accordance with embodiments of the disclosed technology. As shown in FIG. 5, the example data schema 220 can include an ID field 222, a make/model field 224, a capacity field 226, a current condition field 228, and a location field 232. The ID field 222 can be configured to store data representing an identification value of the fuel cell 116 (FIG. 1A) and/or the carrier 112 carrying the fuel cell 116. The make/model field 224 can be configured to contain data identifying a manufacturer, a provider, a model, or other information related to the fuel cell 116. The capacity field 226 can be configured to contain data representing a power capacity of the fuel cell 116 such as a numerical value in kilowatt-hour. The current condition field 228 can be configured to contain data representing one or more of "off," "on," "error," or other suitable types of condition of the fuel cell 116. Though particular fields are illustrated in FIG. 5, in other embodiments, the example data schema can also include fields containing data representing a date/time of installation, a date/time of last modification, or other suitable information.

Figure 6:
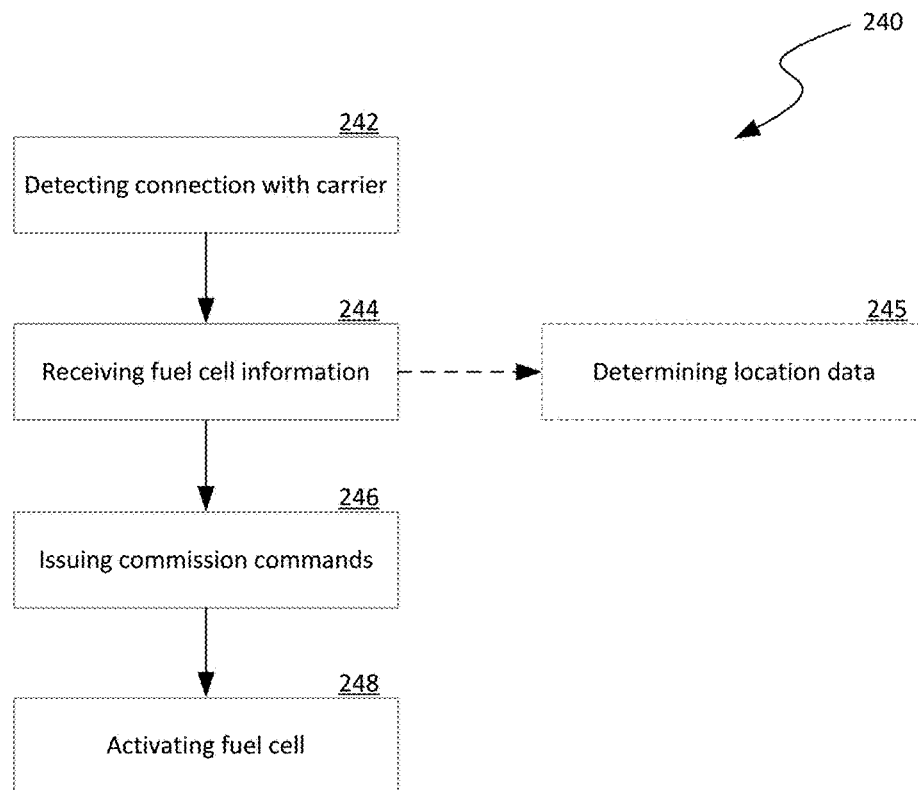
FIGS. 6 and 7 are flowcharts illustrating processes for deploying fuel cells in a facility in accordance with embodiments of the disclosed technology.
Figure 7:
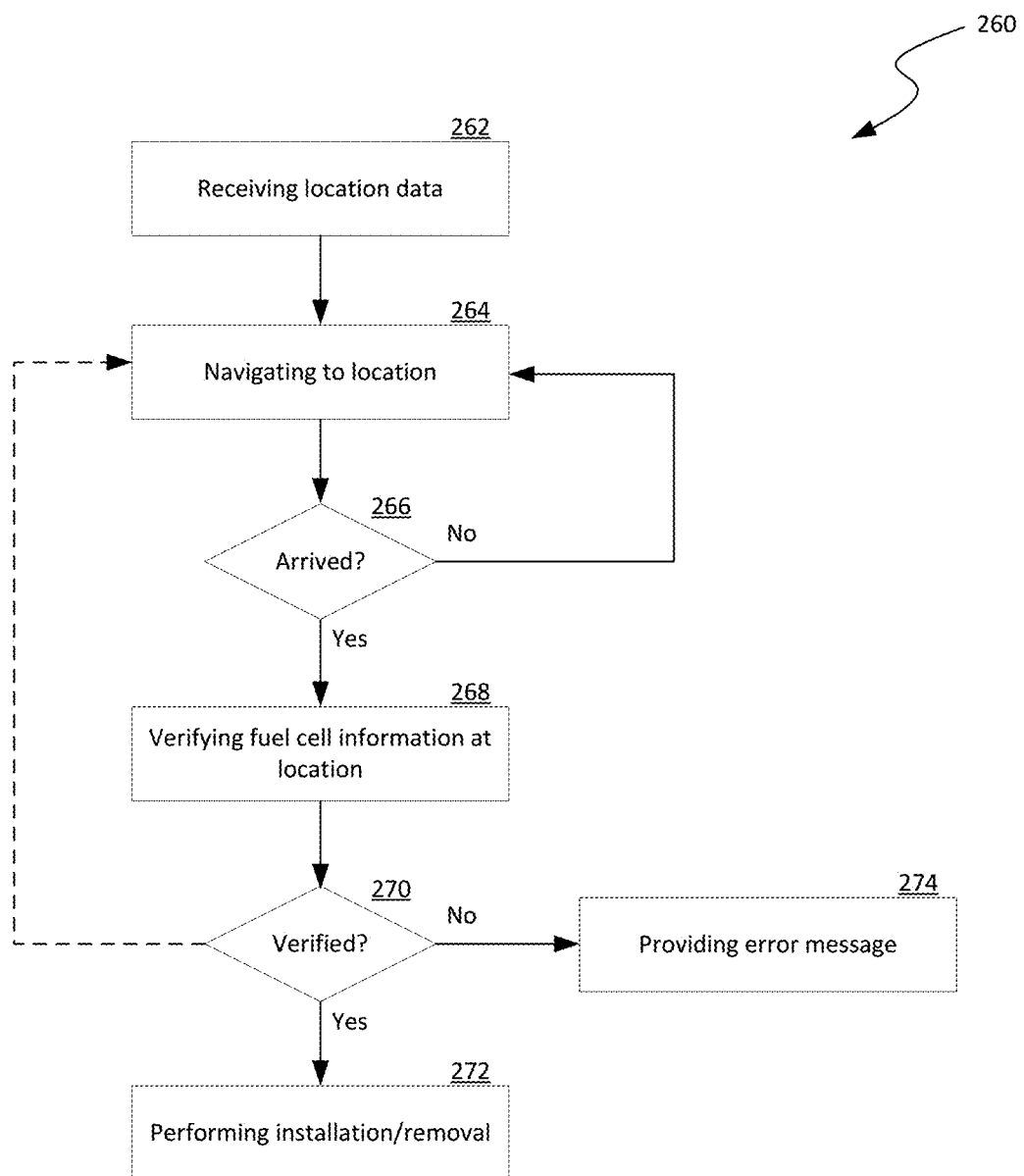

FIGS. 6 and 7 are flowcharts illustrating processes for deploying fuel cells in a facility in accordance with embodiments of the disclosed technology. Though the processes in FIGS. 6 and 7 are described below in the context of the facility 100 in FIGS. 1A-4B, in other embodiments, the processes can also be implemented in facilities with different and/or additional components.

As shown in FIG. 6, a process 240 can include detecting connection of a receptacle 104 (FIG. 1A) with a carrier 112 (FIG. 1A) at stage 242. The process 240 can also include receiving fuel cell information 150 (FIG. 1B) from the carrier controller 114 (FIG. 1B) or the fuel cell 116 (FIG. 1B) at stage 246. The process 240 can also include issuing commission commands at stage 246 and activating the fuel cell at stage 248, as described above in more detail with reference to FIGS. 1A-1C. Though particular sequences of operations are illustrated in FIG. 6, in other embodiments, detecting connection with the carrier 112 at stage 242 can be performed after receiving fuel cell information at stage 244. In addition, the process 240 can also optionally include determining location data at stage 245. The determined location data can then be transmitted to, for example, an automated mover 160 (FIG. 2B) for installing/removing the fuel cell 116, as described in more detail below with reference to FIG. 7.

As shown in FIG. 7, a process 260 for installing/removing a fuel cell 116 (FIG. 1A) from a facility 100 (FIG. 1A) can include receiving location data at stage 262. The process 260 can then include navigating to a receptacle 104 (FIG. 4A) according to the location data at stage 264. The process 240 can then include a decision stage 266 to determine whether the automated mover 160 has arrived at the specified location. In response to determining that the automated mover 160 has arrive at the specified location, the process 240 proceeds to verifying fuel cell information at the location at stage 268. Example operations of verifying the fuel cell information are described above with reference to FIGS. 4A and 4B. The process 240 can then include another decision stage 270 to determine whether the fuel cell information is verified. In response to determining that the fuel cell information is verified, the process 240 proceeds to performing installation or removal of the fuel cell 116 on the carrier 112 at stage 272. Otherwise, the process 240 proceeds to providing an error message at stage 274.

Figure 8:
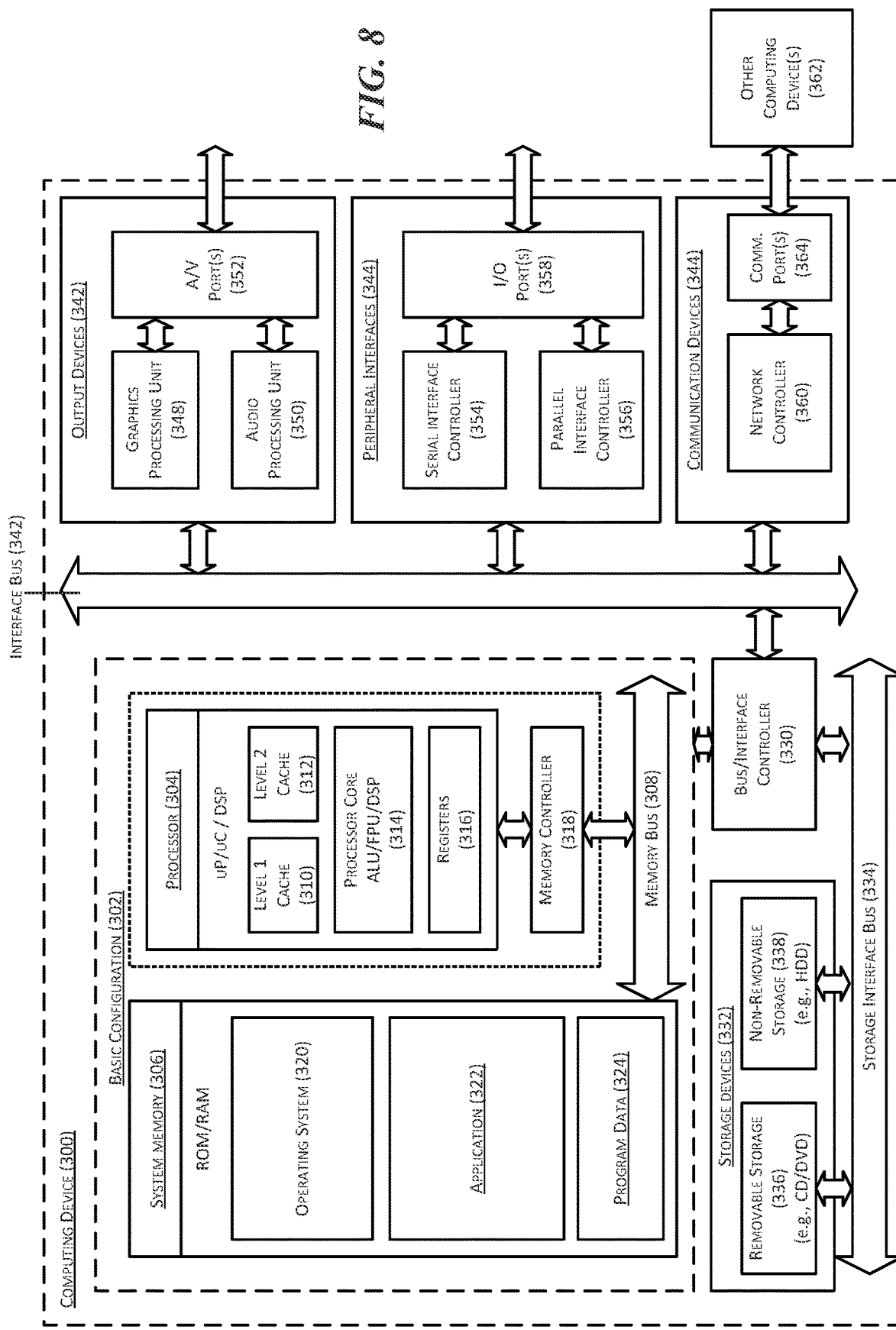
FIG. 8 is a computing device suitable for certain components of the facility in FIGS. 1A-4B.

FIG. 8 is a computing device 300 suitable for certain components of the facility 100 in FIGS. 1A-4B. For example, the computing device 300 can be suitable for the carrier controller 114, the facility controller 130, and the servers 110 of FIGS. 1A-4B. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for deployment of fuel cells, the method comprising:
   at a controller in data communication with a fuel control device,
   receiving data representing fuel cell information of a fuel cell carried on a carrier having a first side connected to a fuel inlet of the fuel cell, a second side having a fuel connector and opposite the first side, and a connection between the fuel inlet of the first side and the fuel connector of the second side; and
   upon detecting the fuel connector of the second side of the carrier being coupled to a fuel port at a receptacle:
   identifying a location of the receptacle that the fuel cell is connected to;
   generating and storing, in a database, a fuel cell record indicating that the fuel cell is physically connected to the receptacle at the identified location, the fuel cell record having at least some of the received data representing the fuel cell information from the fuel cell; and
   instructing the fuel control device corresponding to the identified location to provide fuel to the fuel cell via the fuel port, the fuel connector, the connection between the first side and the second side of the carrier, and the fuel inlet of the fuel cell.

2. The method of claim 1 wherein receiving the data representing the fuel cell information includes receiving the data representing one or more of an identification, a make, a model, a capacity, or a current condition of the fuel cell carried on the carrier from the carrier or an automated mover configured to move the carrier with the fuel cell.

3. The method of claim 1 wherein:
   identifying the location of the receptacle includes identifying the fuel control device at the location of the receptacle; and
   instructing the fuel control device includes instructing the identified fuel control device to provide the fuel to the fuel cell.

4. The method of claim 1 wherein:
   receiving the data representing the fuel cell information includes receiving the data representing one or more of an identification, a make, a model, a capacity, or a current condition of the fuel cell carried on the carrier;
   instructing the fuel control device includes:
   determining whether an available fuel at the identified location is suitable for the fuel cell based on the received data representing the fuel cell information; and
   in response to determining that the available fuel at the identified location is suitable for the fuel cell, instructing the fuel control device to provide the available fuel to the fuel cell.

5. The method of claim 1 wherein:
   receiving the data representing the fuel cell information includes receiving the data representing one or more of an identification, a make, a model, a capacity, or a current condition of the fuel cell carried on the carrier; and
   instructing the fuel control device includes:
   determining whether an available fuel at the identified location is suitable for the fuel cell based on the received data representing the fuel cell information; and
   in response to determining that the available fuel at the identified location is not suitable for the fuel cell, preventing the fuel control device from providing the available fuel to the fuel cell and issuing an error message to an operator.

6. The method of claim 1, further comprising:
   receiving the data representing the fuel cell information includes receiving the data representing one or more of an identification, a make, a model, a capacity, or a current condition of the fuel cell carried on the carrier; and
   instructing the fuel control device includes:
   identifying the fuel control device corresponding to the fuel at the identified location that is suitable for the fuel cell from multiple control devices individually corresponding to a different fuel based on the received data representing the fuel cell information; and
   instructing the identified fuel control device to provide the fuel to the fuel cell.

7. The method of claim 1, further comprising:
   upon receiving the data representing the fuel cell information of the fuel cell,
   determining a location of the receptacle for receiving the fuel cell based on the fuel cell information; and instructing an automated mover to deliver the carrier with the fuel cell to the determined location of the receptacle.

8. The method of claim 1 wherein:
upon detecting the fuel connector of the second side of the carrier being coupled to a fuel port at a receptacle,
issuing operation commands to the fuel cell via the carrier carrying the fuel cell; and
updating the fuel cell record in the database to indicate a current condition of the fuel cell.

9. The method of claim 1, further comprising updating the fuel cell record to indicate that the fuel cell is no longer connected to the receptacle upon removal of the carrier from the receptacle.

10. A computer readable storage device comprising instructions executable by a processor of a computing device to cause the computing device to:
receive data representing fuel cell information of a fuel cell carried on a carrier having a first side connected to a fuel inlet of the fuel cell, a second side having a fuel connector and opposite the first side, and a connection between the fuel inlet of the first side and the fuel connector of the second side; and
upon detecting the fuel connector of the second side of the carrier being coupled to a fuel port at a receptacle,
identify a location of the receptacle that the fuel cell is connected to;
store, in a database, a fuel cell record indicating that the fuel cell is physically connected to the receptacle at the identified location, the fuel cell record having at least some of the received data representing the fuel cell information from the fuel cell; and
instruct a fuel control device corresponding to the identified location to provide fuel to the fuel cell via the fuel port, the fuel connector, the connection between the first side and the second side of the carrier, and the fuel inlet of the fuel cell.

11. The computer readable storage device of claim 10 wherein:
to identify the location of the receptacle includes to identify the control device at the location of the receptacle; and
to instruct the control device includes to instruct the identified control device to provide the fuel to the fuel cell.

12. The computer readable storage device of claim 10 wherein:
to instruct the control device includes to:
determine whether an available fuel at the identified location is suitable for the fuel cell based on the received data representing the fuel cell information; and
in response to determining that the available fuel at the identified location is suitable for the fuel cell, instruct the control device to provide the available fuel to the fuel cell.

13. The computer readable storage device of claim 10 wherein:
to instruct the control device includes to:
determine whether an available fuel at the identified location is suitable for the fuel cell based on the received data representing the fuel cell information; and
in response to determining that the available fuel at the identified location is not suitable for the fuel cell, prevent the control device to provide the available fuel to the fuel cell and issuing an error message to an operator.

14. The computer readable storage device of claim 10 wherein:
to instruct the control device includes to:
identify the control device corresponding to the fuel at the identified location that is suitable for the fuel cell from multiple control devices individually corresponding to a different fuel based on the received data representing the fuel cell information; and
instruct the identified control device to provide the fuel to the fuel cell.

15. The computer readable storage device of claim 10 wherein the instructions executable by the processor further include:
upon receiving the data representing the fuel cell information of the fuel cell,
determine a location of the receptacle for receiving the fuel cell based on the fuel cell information; and
instruct an automated mover to deliver the carrier with the fuel cell to the determined location of the receptacle.

16. The computer readable storage device of claim 10 wherein the instructions executable by the processor further include:
upon detecting the fuel connector of the second side of the carrier being coupled to a fuel port at a receptacle,
issue operation commands to the fuel cell via the carrier carrying the fuel cell; and
update the fuel cell record in the database to indicate a current condition of the fuel cell.

17. A method of providing power from a fuel cell, the method comprising:
at a carrier controller of a carrier,
determining fuel cell information of a fuel cell carried by the carrier; the carrier having a first side connected the fuel cell, a second side having a fuel connector and opposite the first side;
transmitting, via a communication link, the fuel cell information to a controller configured to control fuel flow to the fuel connector;
receiving at least one operation command to change at least one operation of the fuel cell; and
changing at least one operation of the fuel cell.

18. The method of claim 17, further comprising receiving a query for fuel cell information prior to transmitting the fuel cell information.

19. The method of claim 17, wherein the fuel cell information includes one or more of a manufacturer, a serial number, a designed capacity, an operating capacity, current operating state, and fuel cell connections.

20. The method of claim 17, wherein determining fuel cell information of a fuel cell carried by the carrier includes accessing a memory of the fuel cell.

* * * * *